United States Patent [19]
Baker et al.

[11] Patent Number: 5,604,388
[45] Date of Patent: Feb. 18, 1997

[54] SWITCHED RELUCTANCE ROTOR MOLDED LUG

[75] Inventors: Gerald N. Baker; Gary E. Horst, both of St. Louis County, Mo.

[73] Assignee: Emerson Electric Co., St. Louis, Mo.

[21] Appl. No.: 197,250

[22] Filed: Feb. 16, 1994

[51] Int. Cl.$^6$ .................................................. H02K 5/24
[52] U.S. Cl. ............................................ 310/51; 310/261
[58] Field of Search ............................... 310/42, 51, 156, 310/216, 261, 262, 269

[56] References Cited

U.S. PATENT DOCUMENTS

| | | | |
|---|---|---|---|
| 4,916,346 | 4/1990 | Kliman | 310/216 |
| 5,023,502 | 6/1991 | Johnson | 310/261 |
| 5,053,666 | 10/1991 | Kliman et al. | 310/261 |
| 5,144,182 | 9/1992 | Lemmer et al. | 310/217 |

FOREIGN PATENT DOCUMENTS

| | | | |
|---|---|---|---|
| 0155347 | 7/1991 | Japan | 310/269 |

*Primary Examiner*—Steven L. Stephan
*Assistant Examiner*—Judson H. Jones
*Attorney, Agent, or Firm*—Polster, Lieder, Woodruff & Lucchesi

[57] ABSTRACT

A switched reluctance motor (M) comprises a stator assembly (SA) including a stator (S) having a central bore (B) and a plurality of inwardly extending salient teeth (ST). A plurality of stator windings (W) are installed on the stator teeth. A rotor assembly (RA) includes a (R) rotor mounted on a rotor shaft (RS) and installed in the central bore for rotation with respect to the stator assembly. The rotor assembly has a pluralitry of outwardly extending salient teeth (RT) with gaps (G) extending lengthwise of the rotor assembly between adjacent rotor teeth. A noise reducer assembly (10) installed on the rotor assembly reduces the noise produced by the rotor when the motor is operating at normal speeds. The assembly includes a lug (14) made of an electrically non-conducting material inserted in each rotor gap and extending the lengthwise of the rotor assembly. Each lug is hollow with sidewalls (16A, 16B) and an inner endwall (16C) all of whose contours generally form mating contours with the respective sidewalls of the rotor poles and the contour of the rotor at the inner end of a gap. An outer endwall (16D) of a lug has a curved contour the curvature of which generally corresponds to the curvature of the outer face of the rotor poles. The lugs produce a surface between the outer faces of the adjacent rotor poles which generally conforms to the outer surface (F) of the rotor poles for the outer surface of the rotor assembly to be generally uniform thereabout. This helps reduce motor noise. The assembly also includes a cap (20) fitting over each end of the rotor assembly. The lugs are attached to the cap so to install the lugs on the rotor assembly.

29 Claims, 5 Drawing Sheets

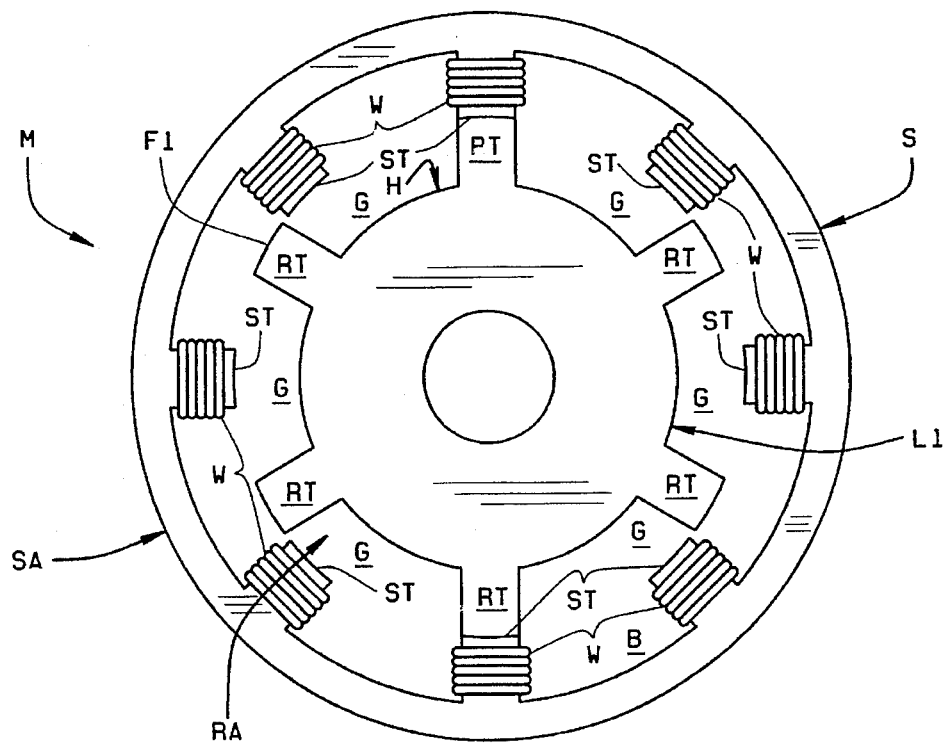
FIG. 1
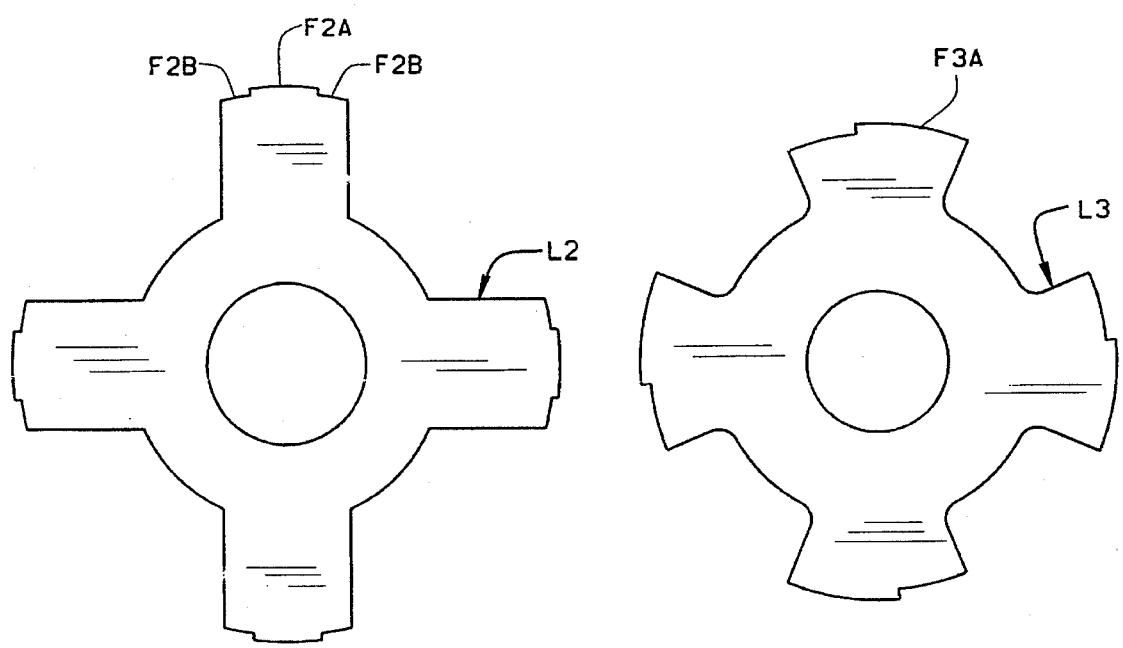
FIG. 2
FIG. 3

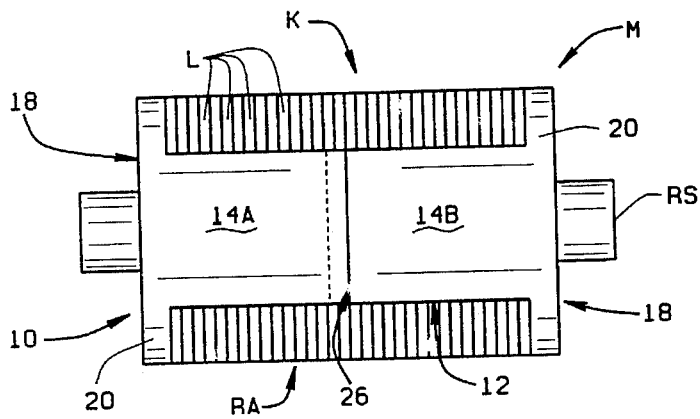
FIG. 4A
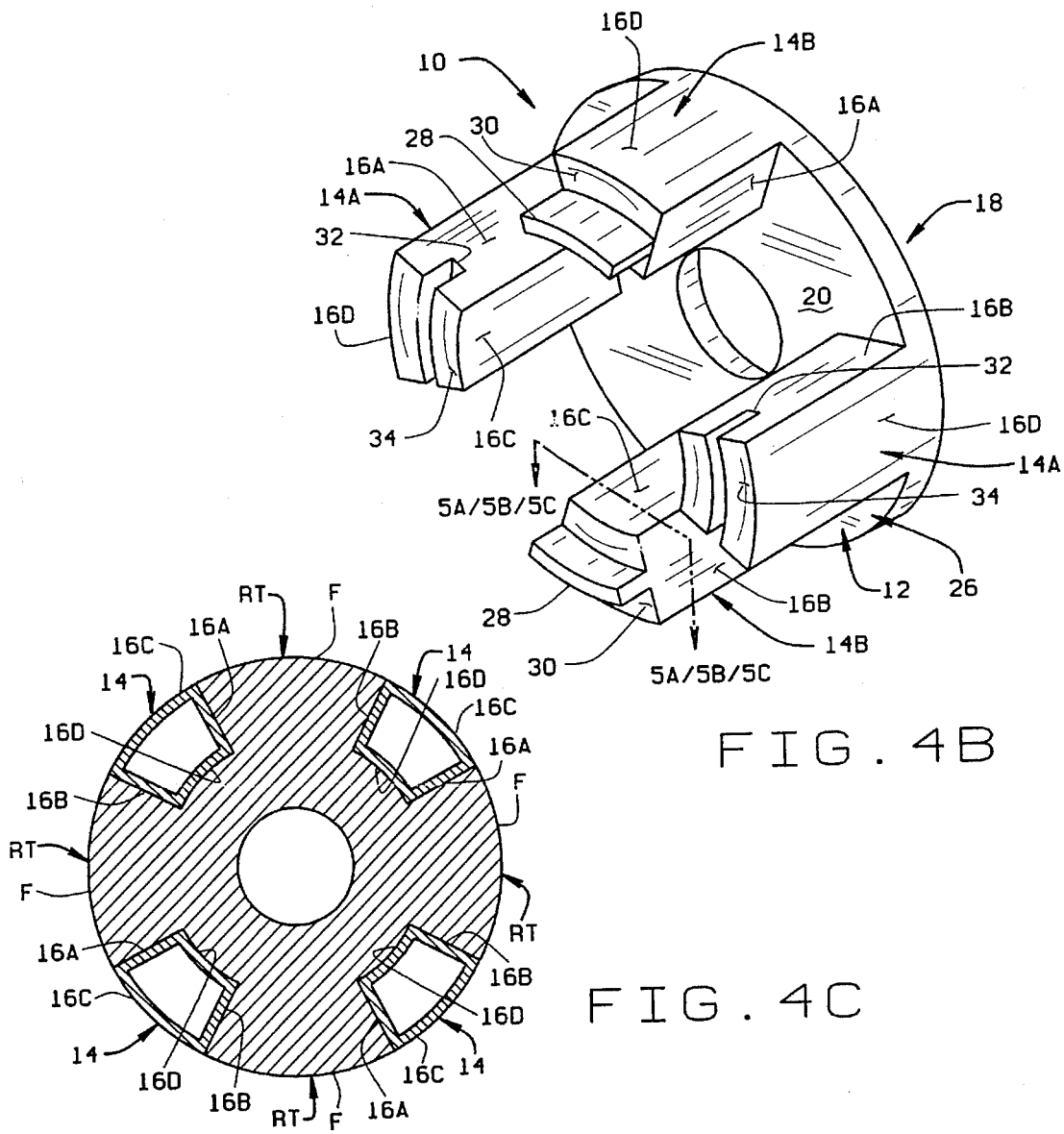
FIG. 4B
FIG. 4C

SWITCHED RELUCTANCE ROTOR MOLDED LUG

BACKGROUND OF THE INVENTION

This invention relates to switched reluctance motors and, more particularly, to a molded end cap-lug assembly which is installed on a rotor assembly of the motor to provide a solid fill of the gap between the rotor poles. The end cap-lug assembly helps eliminate "siren" noise produced during motor operation but does not effect the electromagnetic performance of the motor.

It is known that in switched reluctance motors, there is a certain amount of noise produced by the rotation of the rotor at the motor's typical range of operating speeds. This noise is commonly referred to as a "siren" effect. The source of this noise is due to the countour of the outer surface of the rotor having abrupt changes because the poles of the motor extend outwardly from a central hub of the rotor assembly, with gaps or voids in the space between the poles. This problem has been previously addressed in U.S. Pat. Nos. 5,053,666 to Kliman et al., 5,023,502 to Johnson, and 4,916,346 to Kliman. In each of these earlier attempts at solving the noise problem, the gaps or interpolar spaces between the rotor poles are filled with a material which can be an electrically insulating material. The respective forms of construction utilize segments such as stacked laminations which are inserted in these spaces and then welded in place as taught by Kliman and Kliman et al.,; or, a molded insulation material is inserted in the gap as taught by Johnson. To further help hold the rotor laminations in place, the design of the rotor laminations are modified so that, as shown in the Johnson patent, tangs are formed on the inner curved surface of the lamination at the inner end of the respective gaps, the tangs having a keystone shape. The molded insulation has a corresponding slot so to be fitted into the interpolar space. Kliman et al. (see FIG. 3) employs indentations along the sidewalls of the rotor teeth with the inserts having corresponding bumps so to maintain the laminations of insulating material locked in place. Rotor designs for switched reluctance motors have two basic constructions. In one construction, the poles of the rotor are defined by straight side walls which extend outwardly from a central rotor hub. These are the type rotors where the tangs are indentations help retain the inserts in place when the motor is operating at speed. The other rotor design has shoulders formed at the outer end of the pole and extending circumferentially into the outer portion of the the gap so to overhang the gap and provide an outer shoulder to lock an insert in place.

While the above patents indicate a recognition of the noise problem, the solutions taught by these patents are not necessarily the most cost effective. Adding tangs or indentations to a rotor lamination increases the cost of the lamination and effects the electromagnetic characteristics of the rotor. Welding laminations in place, or gluing them will not necessarily prevent inserts from breaking loose over time and damaging or ruining a motor. The extra steps involved, as part of the rotor fabrication process, to mount and affix the laminations or inserts in place add cost to the motor. Replacement of the inserts or molding requires replacement of the entire rotor assembly because of the way the inserts are attached to the rotor. The size and weight of the inserts or molded parts add substantial weight to the rotor assembly because of the volume of material they contain. It will be noted that, in general, the laminations and molded pieces are solid pieces of whatever material from which they are made. In sum, there is a more cost effective solution to the noise reduction problem which avoids certain of the drawbacks found in the previous attempts to solve the problem.

SUMMARY OF THE INVENTION

Among the several objects of the present invention may be noted the provision of an insert for use on the rotor of a switched reluctance motor to eliminate the "siren" noise generated by the rotor when the motor is running at normal operating speed; the provision of such an insert which comprises a lug sized to fit into the gap between adjacent rotor poles to provide a consistently round, uninterrupted outer rotor surface thereby to minimize variations in the outer contour of the pole which produces the noise; the provision of such a lug which is usable with a variety of rotors including rotors with different numbers of poles, poles having a uniform outer face as well as those having a stepped outer face, the insert being usable with poles which are uniform in contour having a step on either side of a central portion of the pole and poles having a non-uniform contour where the step is only on one side of the pole face; the provision of such an insert which comprises mating assemblies installed on opposite ends of the rotor assembly; the provision of such mating assemblies including an end cap which fits over the respective end lamination of a stack of rotor laminations; the provision of such mating lug assemblies in which respective portions of the assembly readily interlockingly fit together to simplify installation of the assembly during a rotor manufacturing process, and facilitate replacement of the lug assembly thereafter; the provision of such an assembly which, when installed, remains fitted in place and does not loosen or separate from the rotor, even when the motor is operating at high speed; the provision of such an assembly which does not require welding, gluing, or other similar forms of attachment to be installed; the provision of a lug and endcap assembly which is formed of an electrically insulating material; the provision of such a lug and endcap assembly which requires a minimum amount of material to provide a uniform outer rotor contour, the lug, for example, being a hollow lug, or a hollow lug having a stiffening rib, but not necessarily being a solid piece; the provision of such a lug and end cap which may be in one of a plurality of shapes and sizes whereby particular designs are available for use in particular motor applications; and, the provision of a lug and end cap assembly which is a low cost structure easy to fabricate and install.

In accordance with the invention, generally stated, A switched reluctance motor comprises a stator assembly including a stator having a central bore and a plurality of salient teeth extending inwardly toward the bore. A plurality of stator windings are installed on the stator poles. A rotor assembly includes a rotor mounted on a rotor shaft and installed in the central bore for rotation with respect to the stator assembly. The rotor assembly has a plurality of outwardly extending salient teeth with gaps extending lengthwise of the rotor assembly between adjacent rotor teeth. A noise reducer assembly installed on the rotor assembly reduces the "siren" noise produced by the rotor when the motor is operating at normal speeds. The assembly includes a lug inserted in each rotor gap and extending the lengthwise of the rotor assembly. Each lug is made of an electrically non-conducting material. Each lug is also hollow with sidewalls and an inner endwall all of whose contours generally form mating contours with the respective sidewalls of the rotor poles and the contour of the rotor at the inner end of a gap. An outer endwall of a lug has a curved contour the curvature of which generally corresponds to the curvature of the outer face of the rotor poles. The lugs produce a surface between the outer faces of the adjacent rotor poles which generally conforms to the outer surface of the rotor poles for the outer surface of the rotor assembly to be generally uniform thereabout. This helps reduce motor noise. The assembly also includes a cap fitting over each end of the rotor assembly. The lugs are attached to the cap so to install the lugs on the rotor assembly. Other objects and features will be in part apparent and in part pointed out hereinafter.

BRIEF DESCRIPTION OF THE DRAWINGS

FIG. 1 is a simplified sectional view of a switched reluctance motor illustrating the stator and rotor assemblies thereof;

FIG. 2 is a plan view of a second type of rotor lamination used in the motor of FIG. 1;

FIG. 3 is a plan view of a third type of rotor lamination used in the motor of FIG. 1;

FIG. 4A is a side elevational view of rotor with the lug and end cap assembly of the present invention installed;

FIG. 4B is a perspective view of one section of the assembly illustrating one construction of the assembly;

FIG. 4C is a sectional view of a rotor assembly with noise reducing means of the present invention installed;

Corresponding reference characters indicate corresponding parts throughout the several views of the drawings.

DESCRIPTION OF PREFERRED EMBODIMENTS

Figures 5A, 5B, 5C:
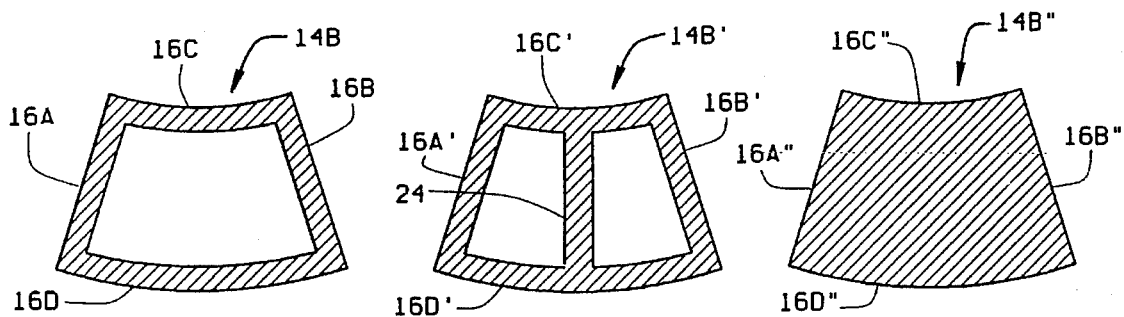
FIG. 5A is a sectional view taken along line 5A—5A in FIG. 4B.
FIG. 5B is a similar sectional view showing an alternate construction.
FIG. 5C is a similar sectional view showing another alternate construction.
Figure 6A:
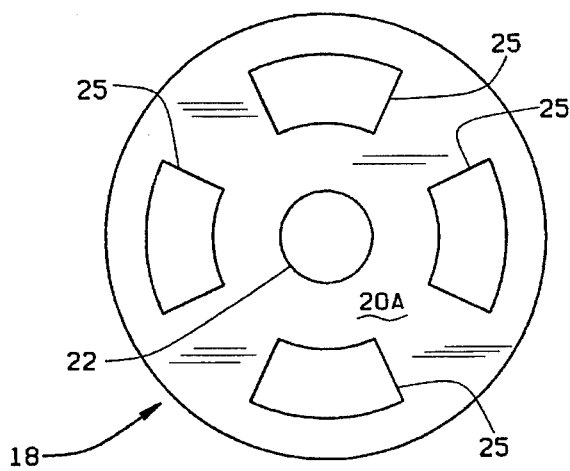
FIG. 6A is an end view of the cap portion of the assembly for the type of lug shown in section in FIG. 5A.
Figure 6B:
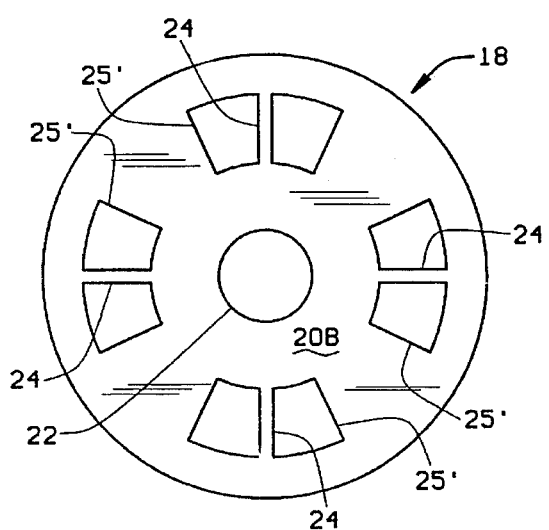
FIG. 6B is a similar end view of the cap for the type of lug shown in section in FIG. 5B.
Figure 6C:
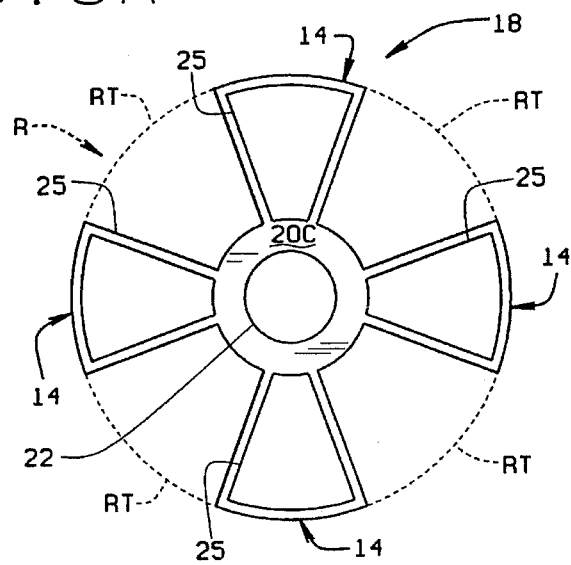
FIG. 6C is a similar end view for an end cap which does not completely cover an end lamination of a rotor stack.

Referring to the drawings, a switched reluctance motor is indicated generally M in FIG. 1. Motor M includes a stator assembly SA having a stator S of conventional design. That is, the stator has a central bore B and a plurality of stator teeth or poles ST. The stator teeth are inwardly salient teeth terminating at bore B. Further, while stator S is shown in FIG. 1 to have eight stator teeth, the stator could have more or fewer teeth without departing from the scope of the invention. The stator assembly further includes a plurality of stator windings W which are installed on the stator teeth in the conventional manner. A rotor assembly RA of the motor includes a rotor R mounted on a rotor shaft RS and installed in the central bore of the stator for rotation with respect to the stator assembly. The rotor assembly has a hub H which fits on the rotor shaft and a pluralitry of rotor teeth RT which are spaced circumferentially about the hub and extend outwardly into the bore. Respective gaps G extend lengthwise of the rotor assembly between adjacent rotor teeth. The rotor assembly of FIG. 1 shows six salient rotor teeth. As before, the rotor could have more or fewer such teeth without departing from the scope of the invention. It will further be understood that motor M can be a single phase reluctance motor; or, it may be a polyphase motor having, for example, 2, 3, 4, or 5 phases depending upon the type of application in which the motor is used.

Figure 12:
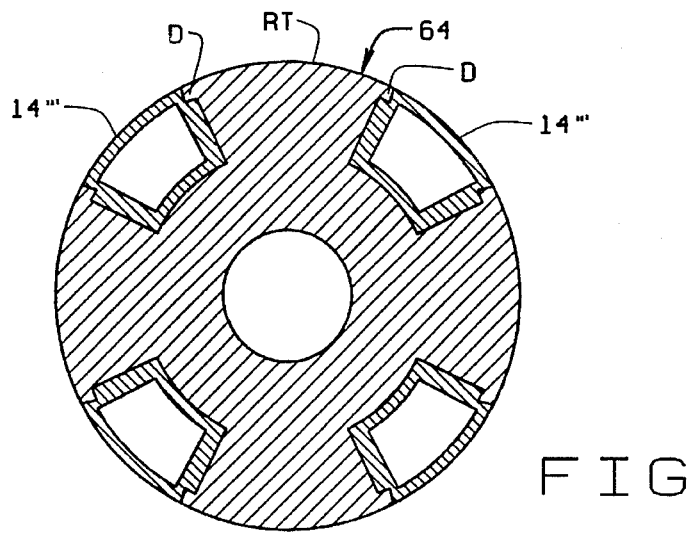

The rotor of motor M is formed of a series of individual laminations stacked together as is well-known in the art. A stack K of laminations L is shown in FIG. 4A. There are various of types of laminations such as those shown in FIGS. 1–3. In FIG. 1, the lamination L1 of rotor R is for a constant air gap motor construction. That is, the outer face or surface F1 of each rotor tooth has a constant diameter so that this outer surface is uniform in curvature across the outer face of the tooth. A lamination L2 shown in FIG. 2 is for use in a dual air gap rotor design. In this construction., the outer face of each rotor tooth has a raised central section F2A of a first diameter. On each side of this central section is a section F2B of a slightly smaller diameter. Consequently, the air gap between the stator teeth and rotor teeth with change from one dimension to another as the rotor teeth sweep past the stator teeth. The lamination L3 shown in FIG. 3 is also for a dual air gap motor construction. In this construction, there is a raised section F3A and a smaller diameter section F3B. Also, as shown in FIG. 12, a rotor lamination such as lamination L4 may have a shoulder D extending partially into the gap between the adjacent teeth at the outer end of the gap. In this instance, the sides of the teeth are not straight. Regardless of the type of lamination used in the rotor construction, the laminations are uniform throughout the length of the stack. With a rotor assembly construction such as shown in FIGS. 1–3, and 12, one problem encountered is the noise produced by the rotor assembly when it is turning at the motor's operating speed, typically thousands of rpm's. One source of this "siren" noise is the discontinuities or abrupt changes in the outer surface of the rotor because of the spacing of rotor teeth and the gaps between them.

A noise reducing means of the present invention is indicated generally 10 in FIGS. 4A and 4B. The purpose of means 10 is to reduce the noise produced by the motor when it is operating at a normal motor speed. Means 10 first includes a lug means 12 inserted in each rotor gap G. As seen in FIGS. 4A and 4B, lug means 12, which is comprised of a plurality of lugs 14, extends lengthwise of rotor assembly RA. Each lug has sidewalls 16A and 16B respectively, as shown in FIG. 4B, and an inner endwall 16C also shown in this Fig. As shown in FIG. 4C, the contours of the respective sidewall and inner endwall form mating contours with the respective sidewalls of the rotor teeth RT and the contour of the rotor at the inner end of the gap G between the rotor teeth; i.e., the curvature of rotor hub H. An outer endwall 16D of each lug has a curved contour. The curvature of this outer contour generally corresponds to the curvature of the outer face F of the rotor teeth. As shown in FIG. 4C, lug means 12 produces a spanning surface between the outer faces of the adjacent rotor teeth which generally conforms to the curvature of the outer surface of the rotor teeth. Accordingly, the outer surface of the rotor assembly is now generally uniform about the circumference of the rotor assembly. Since there are no longer discontinuities or abrupt changes in the contour, the contribution to motor noise caused by the rotor's spinning is substantially reduced.

Next, means 10 includes cap means 18 fitting over each end of the rotor assembly. Cap means 18 comprises a pair of end caps 20. The end caps fit over the respective end lamination of the stack of rotor laminations. Each end cap is a circular end cap having a central bore or opening 22 for the end cap to fit onto the respective end of the rotor shaft when the shaft is attached to the stack. The cap further has an outer diameter corresponding to the diameter of the laminations at the outer face of the rotor teeth so that it covers the abutting face of the lamination. This is as shown for the end caps 20A and 20B in FIGS. 6A and 6B. However, as illustrated by the end cap 20C in FIG. 6C, the end cap has an annular section 22 the inner diameter and outer diameter of which correspond to that of the rotor hub H. The respective lugs 14 extend outwardly from this section. Again, the lugs are sized to fit in the gaps G between adjacent rotor teeth so there is a uniform outer surface countour with the noise reducing means installed. It will be understood with respect to the preceding discussion, that while noise reducing means 10 and its elements are shown in FIGS. 4A–6C for use on a motor with a four-pole motor, means 10 is usable on any rotor assembly regardless of the number of poles. The four pole construction shown in these figures is therefore exemplary only.

As shown in FIG. 4B, the lugs and .end caps are integrally formed, the assembly being, for example, a molded unit made of a plastic or other electrically non-conducting material. Further, as shown in FIGS. 5A and 5B, the lugs are preferably hollow lugs. However, as shown in FIG. 5B, a lug 14B', for example, may be stiffened by including a rib 24 which is centrally positioned inside the lug and extends lengthwise of the lug. Because the lugs are hollow, their outer end form respective openings 25 or 25' in the end caps with which they are formed. As shown in FIG. 5C, a lug 14B" can be molded as a solid piece. Also, as shown in FIG. 12, the lugs 14'" can be molded so they have notches in which the shoulders D of the rotor teeth are accommodated.

Referring again to FIGS. 4A and 4B, lugs 14 of means 10 may each comprise two mating sections indicated 14A and 14B. In FIG. 4B, the four lugs shown are arranged in alternating sections, although all the lugs formed with one end cap may be uniform. With this type of construction, means 10 further includes socket means generally indicated 26 for matingly connecting the lug sections, at their outer ends so the lugs interfit with each other. As best shown in FIG. 4B, socket means 26 includes a tab 28 extending outwardly from the contacting end 30 of one of the lug section; i.e., lug section 14B. The socket means further includes a pocket 32 formed in the contacting end 34 of the other lug section; i.e., lug section 14A. In FIG. 4B, tab 28 is an arcuate tab whose curvature corresponds to that of the outer surface of the rotor. The tab extends transversely of the longitudinal centerline of the section. Pocket 32 comprises an arcuate slot in which the tab fits to lock the lug sections together.

Figure 10A:
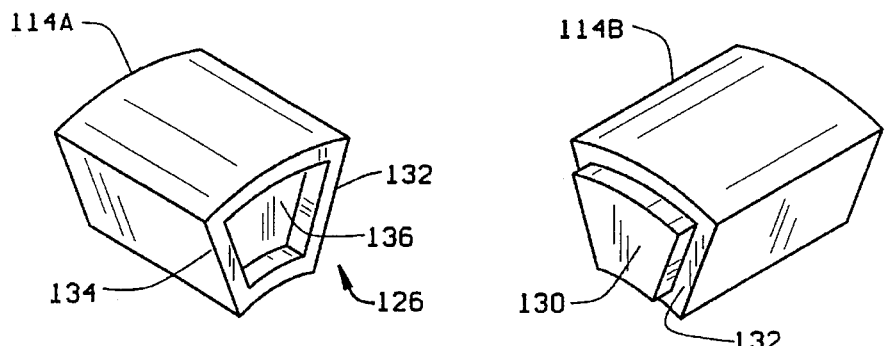
FIGS. 10A and 10B are respective views of a first and a seconds alternate construction for connecting mating sections of a lug to each other.
Figure 10B:
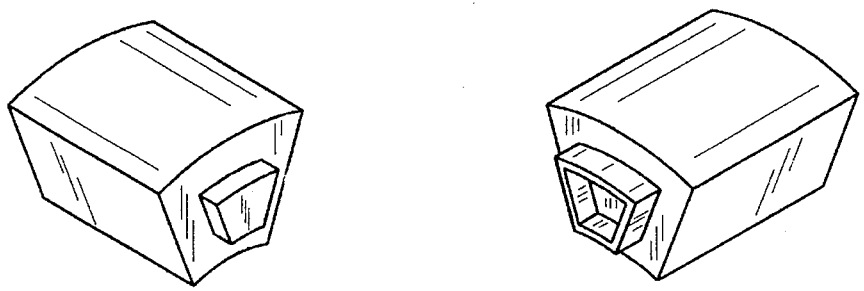
Figure 11:
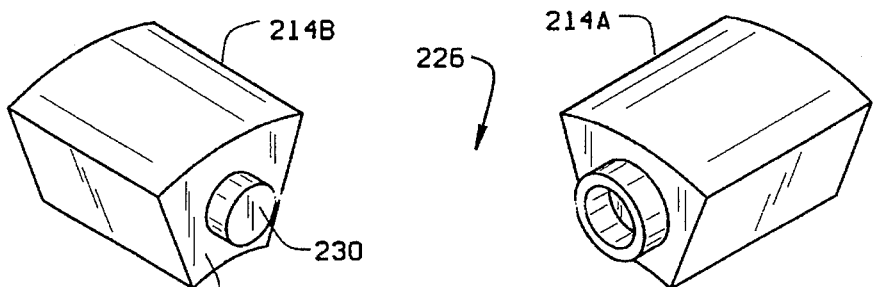
FIGS. 11 is a perspective view of a second alternate construction for connecting mating sections of a lug to each other; and, FIG. 12 is a sectional view of a rotor lamination having shoulders projecting into a gap with the noise reduction assembly installed to effect a uniform outer contour of the resulting rotor assembly.

Referring to FIGS. 10 and 11, alternate embodiments of socket means 26 are shown. In FIG. 10, a socket means 126 is used for joining together lug sections 114A and 114B. In this embodiment, a projection 130 is formed on the contacting end 132 of section 114B. Lug section 114A, which is hollow, is open at its contacting end. Projection 130's shape corresponds to that of lug section 114A. The dimensions of the projection are slightly smaller than that of lug section 114A to account for the thickness of the walls of the section. The lug sections are joined simply by inserting projection 130 into the open end of section 114A. Alternatively, the end of section 114A could be closed and a circumferential shoulder 132 formed at the mating end 134 of the lug. The shoulder defines a pocket 136 whose shape and dimensions conform to those of projection 130 for the projection to fit within the pocket. In FIG. 11, a socket means 226 is used for joining together lug sections 214A and 214B. In this embodiment, a projection 230 formed on the contacting end 232 of section 214B comprises a post. The mating end of section 114A has an annular shoulder 234 thereon defining a circular pocket 236 in which the post fits. It will be appreciated that the various embodiments of the socket means are particularly useful where the sidewalls of the rotor teeth are straight as shown in FIGS. 1–3. Where, as in FIG. 12, the teeth have an overhanging shoulder, the socket means may not be necessary since the shoulders would hold the lugs in the respective gaps despite the centrifugal force created when the motor is at speed. However, it is preferable that lugs employ the socket means regardles of the type of lamination stack with which the noise reducing means is used.

Figure 7:
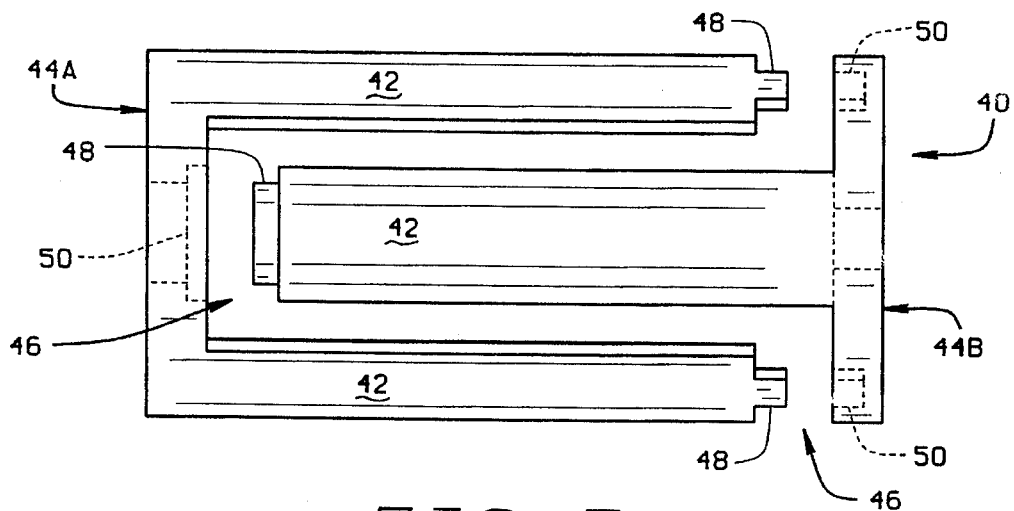
FIG. 7 is an elevational view of an alternate embodiment of the assembly.
Figure 8:
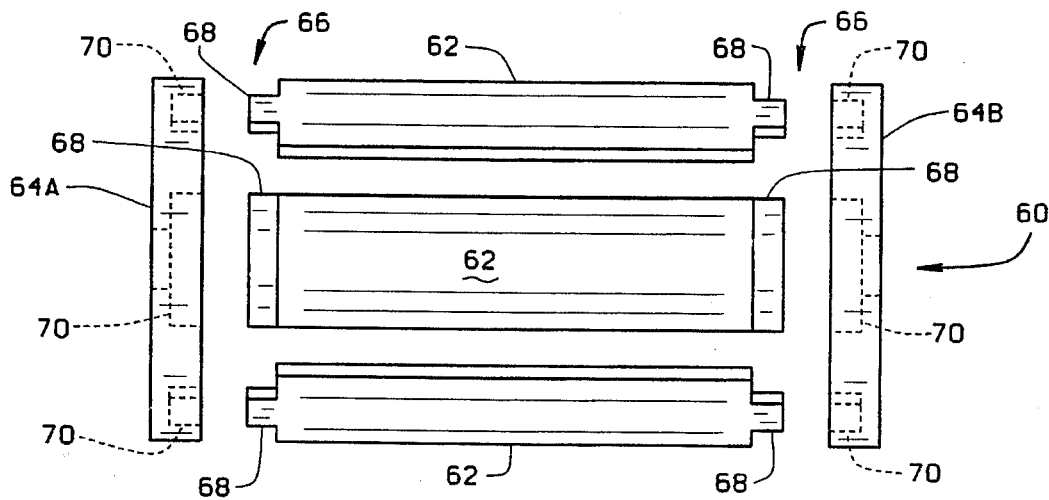
FIG. 8 is an elevational view of another alternate embodiment of the assembly.
Figure 9:
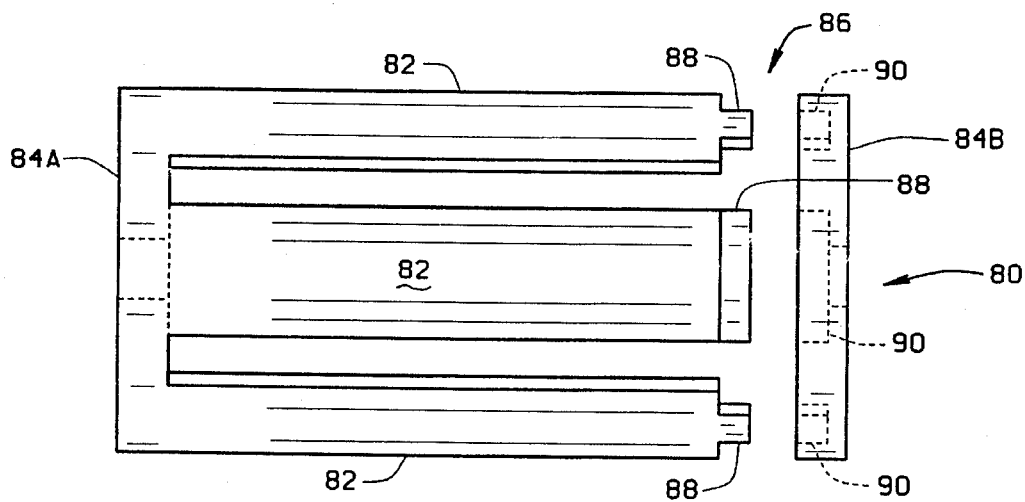
FIG. 9 is an elevational view of yet another alternate embodiment of the assembly.

Finally, referring to FIGS. 7–9, alternate constructions of the noise reducing means are indicated generally 40, 60, and 80 respectively. In FIG. 7, means 40 includes lugs 42 integrally formed with respective end caps 44A, 44B. Unlike the lugs in the previously described embodiments, lugs 42 extend the length of the rotor lamination stack. The lugs are arranged in an alternating fashion whereby the lug fitting in one gap is integrally formed with one end cap and the lug fitting in the adjacent gap is integrally formed with the other end cap. Socket means 46 includes tabs 48 formed on the distal end of each lug. A mating pocket 50 is formed in the appropriate end cap for the two end cap assemblies to be locked together when assembled on the rotor.

In FIG. 8, means 60 includes lugs 62 which again extend the length of the rotor lamination stack. Now, the lugs are not formed with either of the end caps 64A, 64B, but are separate pieces. Socket means 66 includes tabs 48 formed on each end of each lug. A mating pocket 70 is formed in each end cap for the end caps to be locked together with the lugs when the lugs and end caps are assembled on the rotor.

In FIG. 9, means 80 includes lugs 82 integrally formed with one of the end caps 84A. Again, lugs 82 extend the length of the rotor lamination stack. Socket means 86 includes tabs 88 formed on the distal end of each lug. A mating pocket 90 is formed on an end cap 84B for end cap 84B to be locked together when the lugs when the noise reducing means is assembled on the rotor.

With respect to these alternate constructions, it will be understood that the respective socket means 46, 66, 86, could include the tab/slot arrangement shown in FIG. 4B, or the alternate constructions shown in FIGS. 10A, 10B and 11.

During assembly of motor M, the noise reducing means is installed after the rotor lamination stack has been assembled but prior to installing the lamination stack on the rotor shaft.

What has been described is an insert for use on the rotor of a switched reluctance motor. The insert is designed to eliminate noise generated by the poles of the rotor when the motor is at speed. An insert or lug is fitted into each gap between adjacent rotor teeth thereby to provide a consistently round, uninterrupted outer rotor surface. The lug or insert is part of an assembly which minimizes variations in the outer contour of the rotor pole to reduce the amount of noise produced by the rotor when the motor is operating at speed. Lugs are designed to be usable with a variety of rotors including rotors with different numbers of poles, rotors with poles having a uniform outer face, and rotors with poles having a stepped outer face. The lugs are further usable with stepped poles which are uniform in contour having a step on either side of a central portion, of the outer face of the pole, together with poles having a non-uniform contour where the step is only on one side of the pole face. The assembly comprises mating lug assemblies which are installed over opposite ends of the rotor assembly; each mating lug assembly including an end cap fitting over respective end laminations of a stack of rotor laminations. Respective portions of the assemblies interlockingly fit together, this simplifying installation of the assembly during a rotor manufacturing process. There are a variety of possible lug/end cap configurations, all of which produce an interlocking fit which also facilitates replacement of the lug/end cap assembly during motor service. Installation of the assembly does not require welding, gluing, or other similar types of attachment. The assembly is formed of an electrically insulating material, the amount of material used being a minimum amount necessary to provide a uniform outer rotor contour. Thus, a lug is a hollow lug which might have a stiffening rib. The lug and end cap may be in one of a plurality of shapes and sizes whereby particular designs are available for use in particular motor applications. Finally, the assembly is a low cost assembly that is easy to fabricate and assemble.

In view of the foregoing, it will be seen that the several objects of the invention are achieved and other advantageous results are obtained.

As various changes could be made in the above constructions without departing from the scope of the invention, it is intended that all the matter contained in the above description or shown in the accompanying drawings shall be interpreted as illustrative and not in a limiting sense.

Having thus described the invention, what is claimed and desired to be secured by Letters Patent is:

1. A switched reluctance motor comprising:

a stator assembly including a stator having a central bore, a plurality of salient stator teeth extending inwardly toward the bore, and a plurality of stator windings installed on the stator teeth;

a rotor assembly including a rotor mounted on a rotor shaft and installed in the central bore for rotation with respect to the stator assembly, the rotor assembly having a plurality of outwardly extending salient rotor teeth with gaps extending lengthwise of the rotor assembly being between adjacent rotor teeth; and, noise reducing means for reducing the noise produced by the motor when it is operating at a normal motor speed, the noise reducing means including lug means inserted in each rotor gap and extending lengthwise of the rotor assembly, each lug means having sidewalls and an inner endwall all of whose contours generally form mating contours with the respective sidewalls of the rotor teeth and the contour of the rotor at the inner end of the gap between the rotor teeth, and an outer endwall having a curved contour the curvature of which generally corresponds to the curvature of the outer face of the rotor teeth for the lug means to produce a surface between the outer faces of the adjacent rotor teeth which generally conforms to the outer surface of the rotor teeth for the outer surface of the rotor assembly to be generally uniform about the circumference of the rotor assembly so to reduce motor noise, and the noise reducing means further including cap means fitting over each end of the rotor assembly and to which the lug means are attached, the cap means being used to install the lug means on the rotor assembly, the lug means and cap means being made of an electrically non-conducting material, and the cap means comprising a pair of end caps, one to fit over each respective end of the rotor assembly, and the lug means comprises a plurality of separate lugs each of which is insertable into one of the gaps between adjacent rotor teeth, each lug having a first section integrally formed with one end cap and a second section integrally formed with the other end cap, the respective sections of the lugs being inserted into the same gap from opposite ends of the gap with each lug section extending a portion of the length of the gap for the lugs to meet at a location intermediate the ends of the gap, and further including socket means including means formed on the respective contacting ends of the lug sections for the lug sections to interconnect with each other, the socket means including a tab extending outwardly from the contacting end of one of the lug section and a pocket formed in the contacting end of the other lug section, the pocket being sized to receive the tab to lock the respective sections of the lug together whereby the noise reducing means is installed on the rotor assembly so as to remain in place when the motor is operating at speed, the tab comprising a projection whose shape generally conforms to the shape of the contacting end of the lug section, the dimensions of the projection being smaller than the dimensions of the lug section at the contacting end thereof, and the contacting end of the other lug section has a circumferentially extending shoulder formed thereon defining a pocket in which the projection fits to matingly connect the lug sections.

2. The motor of claim 1 wherein the lug means is integrally formed with the cap means.

3. The motor of claim 2 wherein at least one of the lugs is integrally formed with one end cap and further including socket means for attaching the distal end of the lug to the other end cap.

4. The motor of claim 3 wherein each end cap has a plurality of lugs integrally formed therewith, the lugs being hollow lugs to minimize the weight of the noise reducing means.

5. The motor of claim 3 wherein the tab comprises an elongate tab extending transversely of a longitudinal centerline of the one lug section, and the pocket comprises a slot formed in the contacting end of the other lug section and sized to receive the tab.

6. The motor of claim 5 wherein the contacting end of the other lug section is open for the projection on the one lug section to be received in the open end of the other lug section.

7. The motor of claim 2 further including a plurality of lugs integrally formed with each end cap, the length of the respective lugs extending substantially the length of the rotor for the lugs to each fit in one of the gaps between adjacent rotor teeth.

8. The motor of claim 7 further including socket means for attaching the distal end of each lug to other end cap.

9. The motor of claim 8 wherein the socket means includes a tab extending outwardly from the distal end of each lug formed with one end cap and a pocket formed in a face of the other end cap contacted by the distal end of the lug, the pocket being sized to receive the tab to lock the lug together with the other end cap for the noise reducing means, when installed on the rotor assembly, to remain in place when the motor is at its operating speed.

10. The motor of claim 9 wherein each tab comprises a projection whose shape generally conforms to the shape of the end of the lug and whose dimensions are smaller than the dimensions of the lug, and a shoulder is formed on a face of the end cap contacted by the lug, the shoulder thereon defining a pocket in which the projection fits to matingly connect the lug and the other end cap.

11. The motor of claim 10 wherein the lugs integrally formed with one end cap and the lugs integrally formed with the other end cap respectively fit in alternating gaps between the rotor teeth and the socket means includes pockets formed in each end cap between the lugs integrally formed thereon for the distal end of the lugs formed on the respective end caps to matingly fit in the respective pockets formed in the other end caps.

12. The motor of claim 2 wherein each lug extends the length of the rotor for the lugs to each fit in one of the gaps between adjacent rotor teeth, each end of each lug being attached to the respective end caps to lock the lugs in place.

13. The motor of claim 12 further including socket means for attaching the ends of each lug to the respective end caps.

14. The motor of claim 13 wherein the socket means includes a tab extending outwardly from the each end of each lug and a plurality of pockets formed in a face of each end cap, the pockets being formed about an outer circumference of the end cap, the respective pockets being sized to receive a tab to lock the lug together with the end cap whereby the noise reducing means, when installed on the rotor assembly, remains in place when the motor is at its operating speed.

15. The motor of claim 8 wherein the socket means includes a post extending outwardly from the distal end of each lug and an shoulder formed in the face of the end cap contacted by the distal end of the lug and defining a circular pocket the inner diameter of which is sized for the post to be received in the pocket.

16. The motor of claim 8 wherein the socket means includes a post extending outwardly from the face of the end cap contacting the distal end of a lug and an annular shoulder formed on the distal end of the lug and defining a circular pocket the inner diameter of which is sized for the post to be received in the pocket.

17. The motor of claim 2 wherein the lug means comprises a plurality of hollow lugs one to fill each gap.

18. The motor of claim 17 further including stiffeners formed inside each lug to reinforce the lug.

19. The motor of claim 18 wherein the stiffeners comprise ribs extending lengthwise of a lug.

20. The motor of claim 19 wherein the cap means comprises a pair of circular end caps having a central bore for the end caps to fit over respective ends of the rotor about the rotor shaft.

21. The motor of claim 1 wherein the lug means and cap means are integrally formed molded parts.

22. In a switched reluctance motor having a stator assembly including a stator having a central bore, a plurality of salient teeth extending inwardly toward the bore, and a plurality of stator windings installed on the stator teeth, and a rotor assembly including a rotor mounted on a rotor shaft and installed in the central bore for rotation with respect to the stator assembly, the rotor assembly comprising a stack of rotor laminations each of which has a central bore for installing the stack of laminations on the rotor shaft and the rotor laminations defining a plurality of outwardly extending salient rotor teeth with gaps extending lengthwise of the rotor assembly between adjacent rotor teeth, the improvement comprising:

means for reducing the noise produced by the motor when it is operating at a normal motor speed, said noise reducing means including a plurality of lugs sized to fit in each rotor gap and extending the lengthwise of the rotor assembly, the sidewalls and an inner endwall of each lug having a contour generally conforming to that of the respective sidewalls of the rotor teeth and the contour of the rotor at the inner end of the gap between the rotor teeth in which the lug fits, an outer endwall of each lug having a curved contour the curvature of which generally corresponds to the curvature of the outer face of the rotor teeth, the rotor assembly with the lugs installed having a generally uniform contour about the outer surface of the rotor assembly, and said noise reducing means further including an end cap fitting over each end of the stack of rotor laminations, each end cap having a central opening for the end cap to fit over the rotor shaft, and a diameter corresponding to that of the maximum diameter of the laminations for the end cap to completely cover the respective end laminations of the rotor stack, the lugs being attached to the end caps for the end caps to hold the lugs in place when the motor is rotating at its operating speed, the lugs and end caps are made of an electrically non-conducting material, and wherein each lug has a first section integrally formed with one of the end caps and a second section integrally formed with the other end cap, and the improvement further including socket means for attaching the respective sections of the lugs together when the lugs are installed in the gaps, the socket means comprising a projection extending longitudinally outwardly from the outer end of one of the lug sections, the shape of the projection conforming to the shape of the lug section at its outer end but smaller in dimensions than the lug, and a shoulder formed at the outer end of the other lug section, the shoulder extending circumferentially around the outer end of the other lug section, the shoulder having a pocket formed therein corresponding in size and shape to the projection for the projection to be received in the pocket and matingly connect the sections of the lug.

23. The improvement of claim 22 wherein the socket means includes a tab extending outwardly from the outer end of one of the lug sections and a mating slot formed in the outer end of the other lug section, the tab firing in the slot to lock the respective sections of the lug together whereby the lug remains in place when the motor is at its operating speed.

24. The improvement of claim 22 wherein the lugs are hollow lugs.

25. The improvement of claim 24 further including stiffeners formed inside each lug to reinforce the lug.

26. The improvement of claim 25 wherein the stiffeners comprise ribs extending lengthwise of a lug.

27. The improvement of claim 22 wherein the rotor laminations have a central hub section from which the rotor teeth outwardly project, and the end caps have a central section whose outer diameter corresponds to that of the hub, and the lugs extend outwardly from the central section.

28. A switched reluctance motor comprising:

a stator assembly including a stator having a central bore, a plurality of salient stator teeth extending inwardly toward the bore, and a plurality of stator windings installed on the stator teeth;

a rotor assembly including a rotor mounted on a rotor shaft and installed in the central bore for rotation with respect to the stator assembly, the rotor assembly having a plurality of outwardly extending salient rotor teeth with gaps extending lengthwise of the rotor assembly being between adjacent rotor teeth; and, noise reducing means for reducing the noise produced by the motor when it is operating at a normal motor speed, the noise reducing means including a lug inserted in each rotor gap and extending lengthwise of the rotor assembly, each lug having sidewalls and an inner endwall all of whose contours generally form mating contours with the respective sidewalls of the rotor teeth and the contour of the rotor at the inner end of the gap between the rotor teeth in which the respective lugs fit, and an outer endwall having a curved contour the curvature of which generally corresponds to the curvature of the outer face of the rotor teeth for each lug to provide a surface between the outer faces of the adjacent rotor teeth which generally conforms to the outer surface of the rotor teeth for the outer surface of the rotor assembly to be generally uniform about the circumference of the rotor assembly so to reduce motor noise, and the noise reducing means further including cap means fitting over each end of the rotor assembly with respective ends of the lug being attached to a rotor cap, the cap means being used to install a lug in a gap in the rotor assembly, the cap means comprising a pair of end caps, one to fit over each respective end of the rotor assembly, and the lug means comprises a plurality of separate lugs each of which is insertable into one of the gaps between adjacent rotor teeth, each lug having a first section integrally formed with one end cap and a second section integrally formed with the other end cap, the respective sections of the lugs being inserted into the same gap from opposite ends of the gap with each lug section extending a portion of the length of the gap for the lugs to meet at a location intermediate the ends of the gap, and further including socket means including means formed on the respective contacting ends of the lug sections for the lug Sections to interconnect with each other.

29. The motor of claim 28 wherein the socket means includes a tab extending outwardly from the contacting end of one of the lug section and a pocket formed in the contacting end of the other lug section, the pocket being sized to receive the tab to lock the respective sections of the lug together whereby the noise reducing means is installed on the rotor assembly so as to remain in place when the motor is operating at speed.

\* \* \* \* \*